United States Patent
Yamamoto (10) Patent No.: US 10,832,620 B2
(45) Date of Patent: Nov. 10, 2020

(54) LIQUID CRYSTAL DISPLAY DEVICE

(71) Applicant: Sharp Kabushiki Kaisha, Sakai (JP)

(72) Inventor: Kunihiko Yamamoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/562,492

(22) Filed: Sep. 6, 2019

(65) Prior Publication Data

US 2020/0082772 A1    Mar. 12, 2020

Related U.S. Application Data (60) Provisional application No. 62/730,019, filed on Sep. 12, 2018.

(51) Int. Cl.
*G02F 1/1335*  (2006.01)
*G09G 3/36*   (2006.01)
*G09G 3/34*   (2006.01)

(52) U.S. Cl.
CPC ..... *G09G 3/3406* (2013.01); *G02F 1/133528* (2013.01); *G09G 3/36* (2013.01); *G02F 2001/133531* (2013.01); *G09G 2320/0646* (2013.01); *G09G 2320/0673* (2013.01)

(58) Field of Classification Search
None
See application file for complete search history.

(56) References Cited

U.S. PATENT DOCUMENTS

| 2012/0013635 A1* | 1/2012 | Beeman | G09G 3/3607 345/590 |
| 2013/0135366 A1 | 5/2013 | Araki | |
| 2014/0368782 A1* | 12/2014 | Kim | B29D 11/0073 349/153 |
| 2019/0206312 A1* | 7/2019 | Guo | G09G 3/36 |

FOREIGN PATENT DOCUMENTS

WO    2012/085981 A1    6/2012

\* cited by examiner

*Primary Examiner* — Matthew Yeung
(74) *Attorney, Agent, or Firm* — Keating & Bennett, LLP (57) ABSTRACT

A liquid crystal display device includes: a liquid crystal panel including a curved screen; a backlight; a signal corrector configured to generate a control signal that sets a luminance of the backlight to a lower level at a lower grayscale level of a video signal input thereto, and output the video signal and the control signal; a liquid crystal panel driver configured to drive the liquid crystal panel based on the video signal output from the signal corrector; and a backlight driver configured to drive the backlight based on the control signal output from the signal corrector, the liquid crystal panel including a first polarizing plate, a liquid crystal cell, and a second polarizing plate, the first and second polarizing plates being disposed such that their transmission axes form an angle θ (unit: °), the angle θ satisfying a relationship 85<θ<90 or 90<θ<95.

6 Claims, 6 Drawing Sheets

Region with significant shift in stress direction

LIQUID CRYSTAL DISPLAY DEVICE

CROSS-REFERENCE TO RELATED APPLICATIONS

The present application claims priority under 35 U.S.C. § 119 to U.S. Provisional Patent Application No. 62/730,019 filed on Sep. 12, 2018, the contents of which are incorporated herein by reference in their entirety.

BACKGROUND OF THE INVENTION

Field of the Invention

The present invention relates to liquid crystal display devices.

Description of Related Art

Liquid crystal display devices are display devices utilizing a liquid crystal layer (liquid crystal molecules) to display images (e.g., WO 2012/085981). A typical display mode for liquid crystal display devices applies light from a backlight to a liquid crystal layer held between a pair of substrates and controls the amount of light transmitted through the liquid crystal layer by applying voltage to the liquid crystal layer to change the alignment of liquid crystal molecules.

BRIEF SUMMARY OF THE INVENTION

Along with use of liquid crystal display devices in various applications, techniques to curve the liquid crystal display devices have been studied. Curving a liquid crystal display device, however, generates stress in the pair of substrates constituting the liquid crystal display device, resulting in a photoelastic retardation. This may cause light leakage in the screen. The light leakage is perceived as, for example, a pale white display portion on a black display screen and may decrease the contrast ratio.

As described above, there has been an issue of increasing the contrast ratio while reducing or eliminating light leakage when a liquid crystal display device is curved, and the invention disclosed in WO 2012/085981, for example, can still be improved in terms of this issue of increasing the contrast ratio while reducing or eliminating light leakage.

In response to the above issue, an object of the present invention is to provide a liquid crystal display device in which light leakage in a curved state is reduced or eliminated and which has a high contrast ratio.

(1) One embodiment of the present invention is directed to a liquid crystal display device including: a liquid crystal panel including a curved screen; a backlight; a signal corrector configured to generate a control signal that sets a luminance of the backlight to a lower level at a lower grayscale level of a video signal input thereto, and output the video signal and the control signal; a liquid crystal panel driver configured to drive the liquid crystal panel based on the video signal output from the signal corrector; and a backlight driver configured to drive the backlight based on the control signal output from the signal corrector, the liquid crystal panel including a first polarizing plate, a liquid crystal cell, and a second polarizing plate in a stated order, the first polarizing plate and the second polarizing plate being disposed such that their transmission axes form an angle θ (unit: °), the angle θ satisfying a relationship $85<\theta<90$ or $90<\theta<95$.

(2) In an embodiment of the present invention, the liquid crystal display device includes the structure (1), and the control signal sets the luminance of the backlight such that a gamma value included in gamma characteristics is 2.2.

(3) In an embodiment of the present invention, the liquid crystal display device includes the structure (1) or (2), the angle θ satisfies a relationship $85<\theta\leq88.6$ or $91.4\leq\theta<95$.

The present invention can provide a liquid crystal display device in which light leakage in a curved state is reduced or eliminated and which has a high contrast ratio.

DETAILED DESCRIPTION OF THE INVENTION

The present invention is described in more detail based on the following embodiment with reference to the drawings. The embodiment, however, is not intended to limit the scope of the present invention. The configurations of the embodiment may appropriately be combined or modified within the spirit of the present invention.

Embodiment

Figure 1:
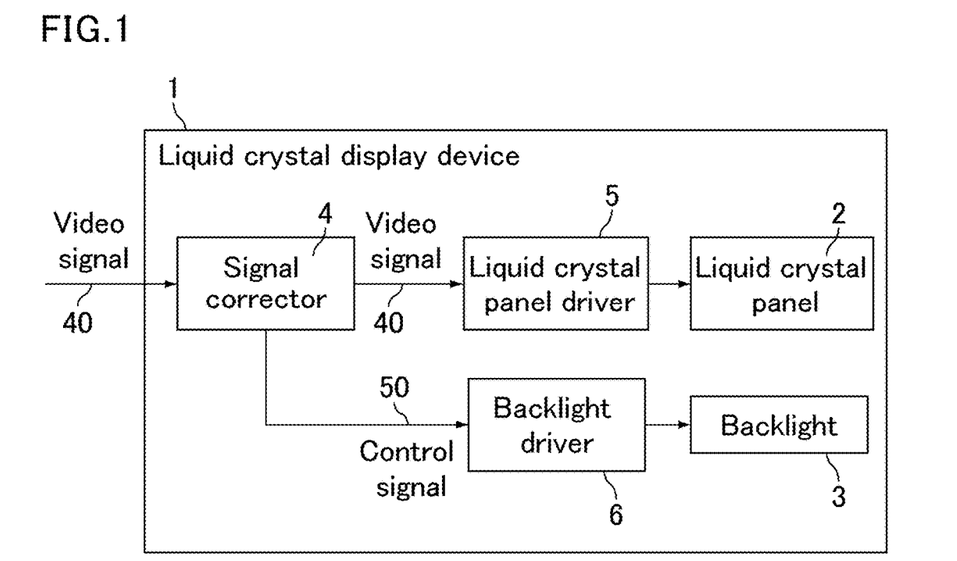
FIG. 1 is a block diagram showing the structure of a liquid crystal display device of an embodiment.

FIG. 1 is a block diagram showing the structure of a liquid crystal display device of an embodiment. As shown in FIG.

1, a liquid crystal display device 1 includes a liquid crystal panel 2, a backlight 3, a signal corrector 4, a liquid crystal panel driver 5, and a backlight driver 6.

Figure 2:
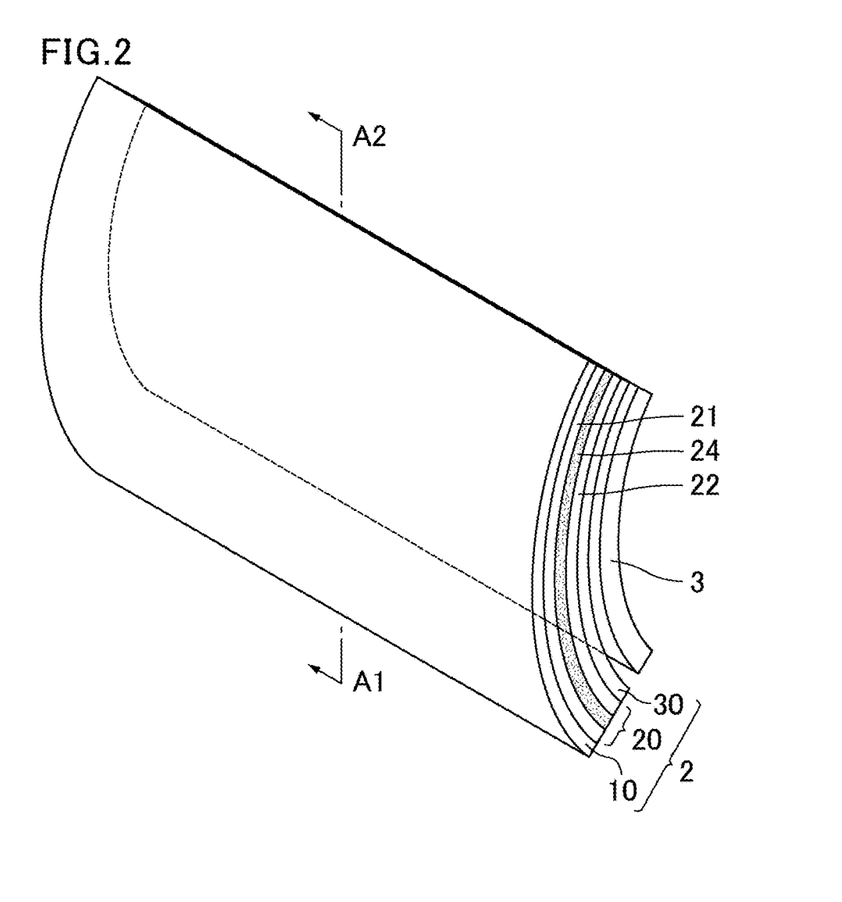
FIG. 2 is a schematic perspective view showing the liquid crystal panel and the backlight in FIG. 1.
Figure 3:
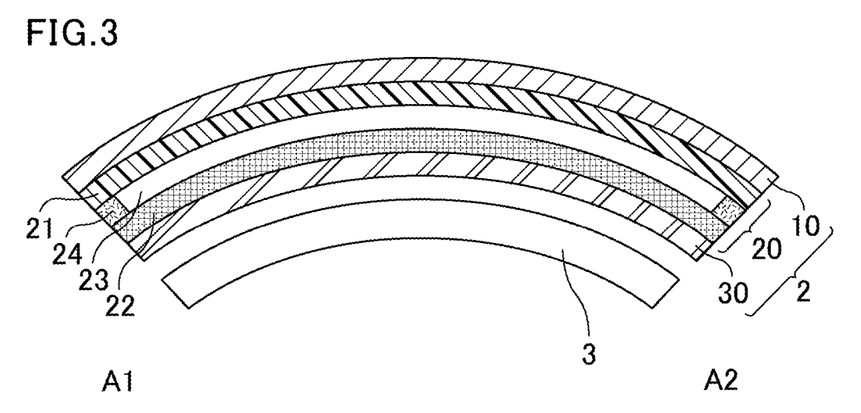
FIG. 3 is a schematic cross-sectional view showing the portion taken along the line A1-A2 in FIG. 2.

FIG. 2 is a schematic perspective view showing the liquid crystal panel and the backlight in FIG. 1. FIG. 3 is a schematic cross-sectional view showing the portion taken along the line A1-A2 in FIG. 2. As shown in FIGS. 2 and 3, the liquid crystal panel 2 and the backlight 3 are disposed in the stated order from the viewing surface side to the back surface side. Herein, the viewing surface side means the side closer to the screen of the liquid crystal panel, which is, for example, the liquid crystal panel 2 side in FIG. 2. The back surface side means the side farther from the screen of the liquid crystal panel, which is, for example, the backlight 3 side in FIG. 2.

<Liquid Crystal Panel>

The liquid crystal panel 2 includes, from the viewing surface side to the back surface side, a first polarizing plate 10, a liquid crystal cell 20, and a second polarizing plate 30 in the stated order.

The liquid crystal cell 20 includes a first substrate 21, a second substrate 22, a liquid crystal layer 23, and a sealant 24. In the liquid crystal cell 20, the first substrate 21 is disposed on the first polarizing plate 10 side, and the second substrate 22 is disposed on the second polarizing plate 30 side and faces the first substrate 21. The liquid crystal layer 23 is held between the first substrate 21 and the second substrate 22. The sealant 24 surrounds the liquid crystal layer 23 and bonds the outer edges (four sides) of the first substrate 21 and the second substrate 22.

The first substrate 21 may be, for example, a transparent substrate such as a glass substrate or a plastic substrate. On the liquid crystal layer 23 side of the first substrate 21 may appropriately be disposed component(s) such as color filters, a black matrix, and/or an overcoat layer. These components can be known ones.

The second substrate 22 may be, for example, a transparent substrate such as a glass substrate or a plastic substrate. On the liquid crystal layer 23 side of the second substrate 22 may appropriately be disposed component(s) such as gate lines, source lines, thin-film transistor elements, and/or electrodes. These components can be known ones.

The liquid crystal layer 23 contains a liquid crystal material, which may be a positive liquid crystal material having positive anisotropy of dielectric constant or a negative liquid crystal material having negative anisotropy of dielectric constant.

The sealant 24 may be, for example, a cured product of a curable resin-based adhesive such as an acrylic epoxy-based adhesive. The curable resin-based adhesive may be one curable by light (photo-curable one), one curable by heat (heat-curable one), or one curable by both light and heat (photo- and heat-curable one).

The first polarizing plate 10 and the second polarizing plate 30 may each be, for example, obtained by dyeing a polyvinyl alcohol film with an anisotropic material such as an iodine complex (or dye) to adsorb the iodine complex on the polyvinyl alcohol film, and stretching the film for alignment. The polarizing plate herein means a linearly polarizing plate (absorptive polarizing plate) and is distinguished from a circularly polarizing plate.

The liquid crystal panel 2 may be a liquid crystal panel in a normally black mode such as the in-plane switching (IPS) mode, the fringe field switching (FFS) mode, or the vertical alignment (VA) mode, or a liquid crystal panel in a normally white mode such as the twisted nematic (TN) mode. Herein, a liquid crystal panel in a normally black mode has the minimum light transmittance (in the black display state) with no voltage applied to the liquid crystal layer and increases in light transmittance as the magnitude of voltage applied to the liquid crystal layer increases. A liquid crystal panel in a normally white mode has the maximum light transmittance (in the white display state) with no voltage applied to the liquid crystal layer and decreases in light transmittance as the magnitude of voltage applied to the liquid crystal layer increases.

<Backlight>

The backlight 3 may be, for example, an edge-lit backlight or a direct-lit backlight. The light source of the backlight 3 may be, for example, a light emitting diode (LED) or a cold cathode fluorescent lamp (CCFL).

<Signal Corrector>

The signal corrector 4 generates, based on a video signal 40 input thereto, a control signal 50 that changes the luminance of the backlight 3. The signal corrector 4 outputs the video signal 40 to the liquid crystal panel driver 5 and outputs the control signal 50 to the backlight driver 6. The control signal 50 is described in detail below.

<Liquid Crystal Panel Driver>

The liquid crystal panel driver 5 drives the liquid crystal panel 2 based on the video signal 40 output from the signal corrector 4 and includes a drive circuit such as a driver. In the case where gate lines and source lines are disposed in the liquid crystal panel 2 (e.g., second substrate 22), the liquid crystal panel driver 5 includes a gate line drive circuit and a source line drive circuit.

<Backlight Driver>

The backlight driver 6 drives the backlight 3 based on the control signal 50 output from the signal corrector 4 and includes a drive circuit such as a driver.

As shown in FIGS. 2 and 3, in the state where the liquid crystal display device 1 is curved, the liquid crystal panel 2 has a curved screen and the backlight 3 is curved to fit the curved shape of the liquid crystal panel 2. Also in the state where the liquid crystal display device 1 is curved, tensile stress is generated in the first substrate 21 while compression stress is generated in the second substrate 22. This produces a photoelastic retardation in the first substrate 21 and the second substrate 22.

In the liquid crystal panel 2, the outer edges (four sides) of the first substrate 21 and the second substrate 22 are bonded to each other with the sealant 24. This structure, in the state where the liquid crystal display device 1 is curved, generates compressive stress in the second substrate 22 but causes the outer edges of the second substrate 22 to be pulled by the sealant 24. The compressive stress direction near the outer edges of the second substrate 22 therefore tends to shift significantly from the compressive stress direction in the other regions, which increases the retardation. Also, the tensile stress direction near the outer edges of the first substrate 21 tends to shift significantly from the tensile stress direction in the other regions, which increases the retardation.

Figure 4:
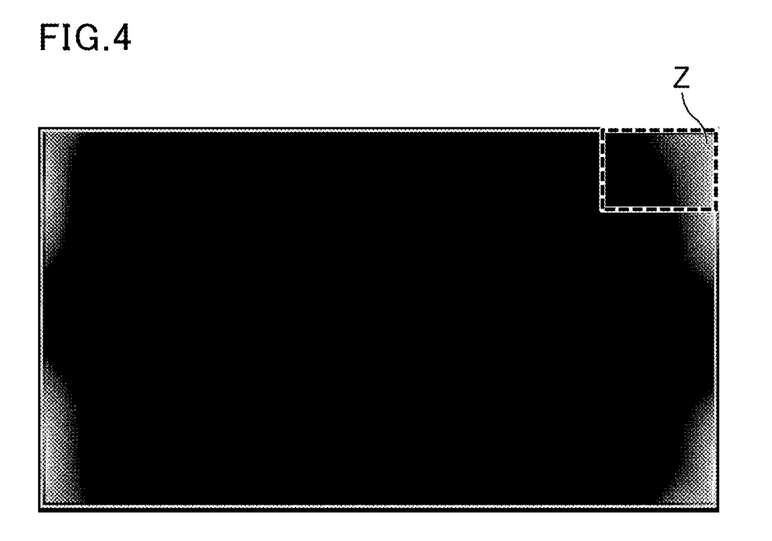
FIG. 4 is a photograph showing exemplary light leakage in the black display screen generated in a conventional liquid crystal display device in a curved state.

Accordingly, in the state where the liquid crystal display device 1 is curved, light leakage due to the retardation, such as light leakage Z at the corners (four corners) of the black display screen as shown in FIG. 4, was supposed to occur. FIG. 4 is a photograph showing exemplary light leakage in the black display screen generated in a conventional liquid crystal display device in a curved state.

Figure 5:
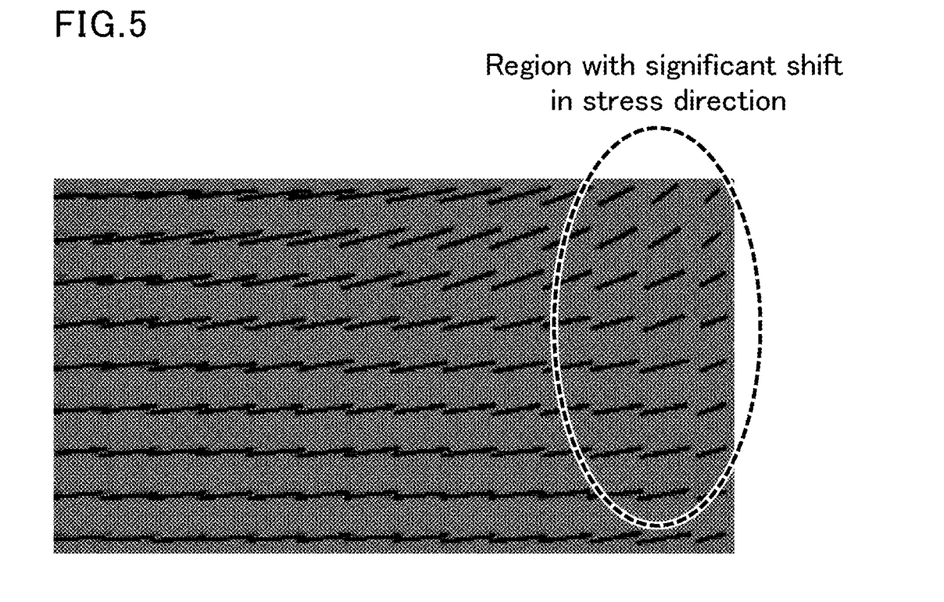
FIG. 5 shows a simulation result of the compressive stress direction in a second substrate at the corner surrounded by the dotted line in FIG. 4.

FIG. 5 shows a simulation result of the compressive stress direction in a second substrate at the corner surrounded by the dotted line in FIG. 4. In FIG. 5, the arrows indicate the compressive stress direction. As shown in FIG. 5, in the state where the liquid crystal display device 1 is curved, the compressive stress direction in the second substrate 22 at the corner of the black display screen shifts significantly from the compressive stress direction in the other regions (the arrows point directions oblique from the long direction).

The intensity of light leakage is known to have a proportional relationship represented by the following formula (F).

$$\text{"Intensity of light leakage"} \propto [(C^2 t^4 E^2) \times \sin^2(2(\beta - \alpha))] / R^2 \quad (F)$$

α: azimuth angle of the transmission axis of the second polarizing plate 30 (first polarizing plate 10)

β: azimuth angle of the compressive stress (tensile stress) in the second substrate 22 (first substrate 21)

C: photoelastic constant of the second substrate 22 (first substrate 21)

t: thickness of the second substrate 22 (first substrate 21)

E: Young's modulus of the second substrate 22 (first substrate 21)

R: curvature radius of the second substrate 22 (first substrate 21)

According to the formula (F), the intensity of light leakage increases as β−α becomes close to 45°. Meanwhile, the intensity of light leakage is 0 when β−α is 0° or 90°.

As described above, in consideration of the simulation result as shown in FIG. 5 and the formula (F), for example, in the case where the liquid crystal panel 2 is a normally black liquid crystal panel and the transmission axis direction of the second polarizing plate 30 is the long direction in FIG. 5, light leakage Z (region with high intensity of light leakage) as shown in FIG. 4 was supposed to be perceived at the corner of the black display screen.

In contrast, the present embodiment employs the following settings (A) and (B): (A) the first polarizing plate 10 and the second polarizing plate 30 are disposed such that their transmission axes form an angle θ (unit: °), and the angle is set to 85<θ<90 or 90<θ<95; and (B) the signal corrector 4 generates a control signal 50 that sets the luminance of the backlight 3 to a lower level at a lower grayscale level of the video signal 40 input to the signal corrector 4. Hereinafter, the settings (A) and (B) are described using an exemplary case where the liquid crystal panel 2 is a normally black liquid crystal panel.

Figure 6:
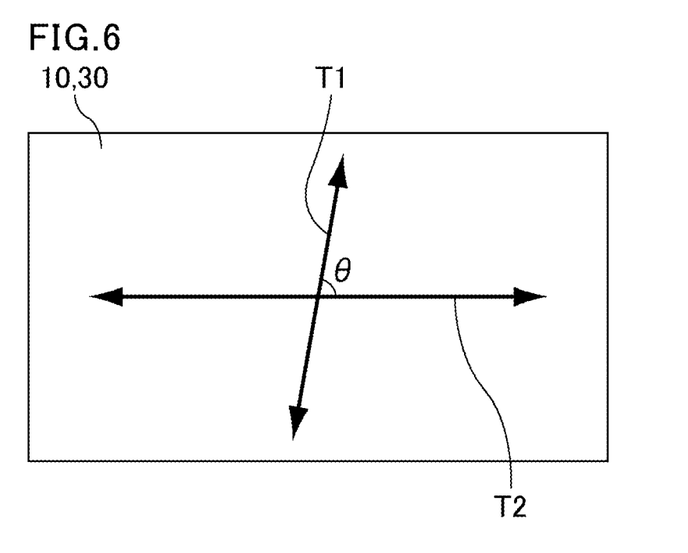
FIG. 6 is a schematic view showing the relationship between the transmission axis of a first polarizing plate and the transmission axis of a second polarizing plate in a plan view of the liquid crystal panel in FIG. 2.
Figure 7:
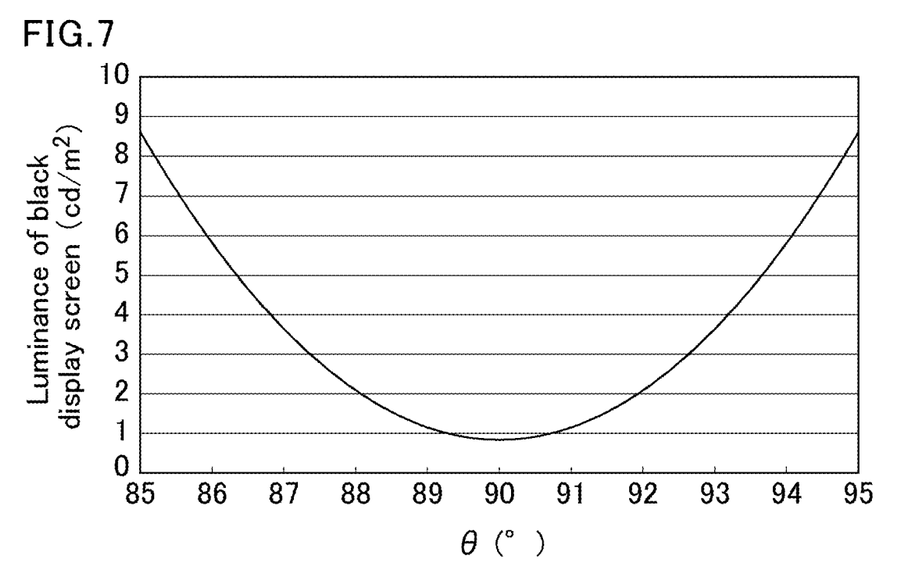
FIG. 7 is a graph showing an exemplary relationship between the angle formed by the transmission axis of the first polarizing plate and the transmission axis of the second polarizing plate and the luminance of the black display screen.

First, the setting (A) is described. FIG. 6 is a schematic view showing the relationship between the transmission axis of the first polarizing plate and the transmission axis of the second polarizing plate in a plan view of the liquid crystal panel in FIG. 2. The angle θ (unit: °) in FIG. 6 indicates the angle formed by a transmission axis T1 of the first polarizing plate 10 and a transmission axis T2 of the second polarizing plate 30 when the counterclockwise direction is defined as positive with the direction of the transmission axis T2 of the second polarizing plate 30 as the reference (long direction: 0°). When the angle θ formed by the transmission axis T1 of the first polarizing plate 10 and the transmission axis T2 of the second polarizing plate 30 is 90° (when the direction of the transmission axis T1 of the first polarizing plate 10 is the short direction in FIG. 6), light leakage Z occurs at a corner of the black display screen as shown in FIG. 4. When the angle θ formed by the transmission axis T1 of the first polarizing plate 10 and the transmission axis T2 of the second polarizing plate 30 is shifted to an angle different from 90°, the overall luminance of the black display screen (including the region where light leakage Z was supposed to occur) increases as shown in FIG. 7, so that light leakage Z as shown in FIG. 4 is less likely to be perceived. FIG. 7 is a graph showing an exemplary relationship between the angle formed by the transmission axis of the first polarizing plate and the transmission axis of the second polarizing plate and the luminance of the black display screen.

Figure 8:
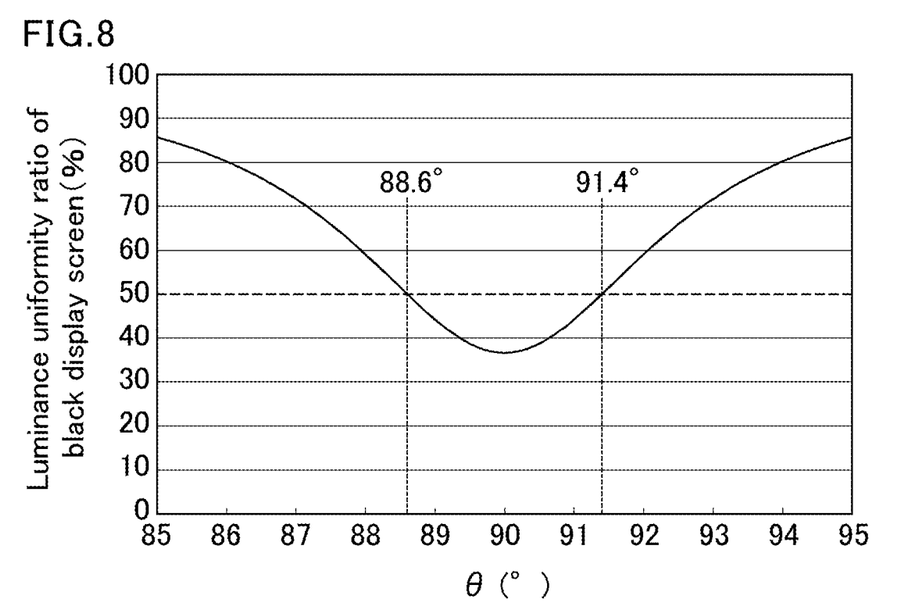
FIG. 8 is a graph showing an exemplary relationship between the angle formed by the transmission axis of the first polarizing plate and the transmission axis of the second polarizing plate and the luminance uniformity ratio of the black display screen.
Figure 9:
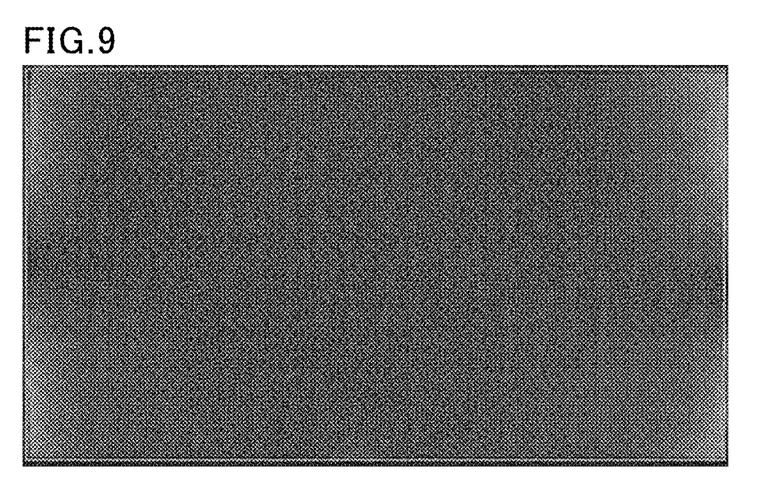
FIG. 9 is a photograph showing the display state in which the luminance of the black display screen is increased from that in the conventional display state shown in FIG. 4.

An increase in luminance of the black display screen leads to an increase in luminance uniformity ratio of the black display screen as shown in FIG. 8. FIG. 8 is a graph showing an exemplary relationship between the angle formed by the transmission axis of the first polarizing plate and the transmission axis of the second polarizing plate and the luminance uniformity ratio of the black display screen. In FIG. 8, the vertical axis "luminance uniformity ratio of black display screen" (unit: %) is defined as 100×"minimum luminance"/"maximum luminance" in the long direction of the black display screen. As shown in FIG. 8, setting the relationship θ≠90 can increase the luminance uniformity ratio of the black display screen as compared with the case of setting the relationship θ=90. For example, in a conventional display state as shown in FIG. 4 where the relationship θ=90 is set, light leakage Z occurs at a corner of the black display screen and the luminance uniformity ratio of the black display screen is 35%. In contrast, in a display state as shown in FIG. 9 where the relationship θ≠90 is set, the luminance uniformity ratio of the black display screen is higher than 35%, meaning that the influence of the light leakage Z is reduced. FIG. 9 is a photograph showing the display state in which the luminance of the black display screen is increased from that in the conventional display state shown in FIG. 4. Also, as shown in FIG. 8, setting the relationship θ≤88.6 or θ≥91.4 is preferred because the luminance uniformity ratio of the black display screen can be increased to 50% or higher.

Figure 10:
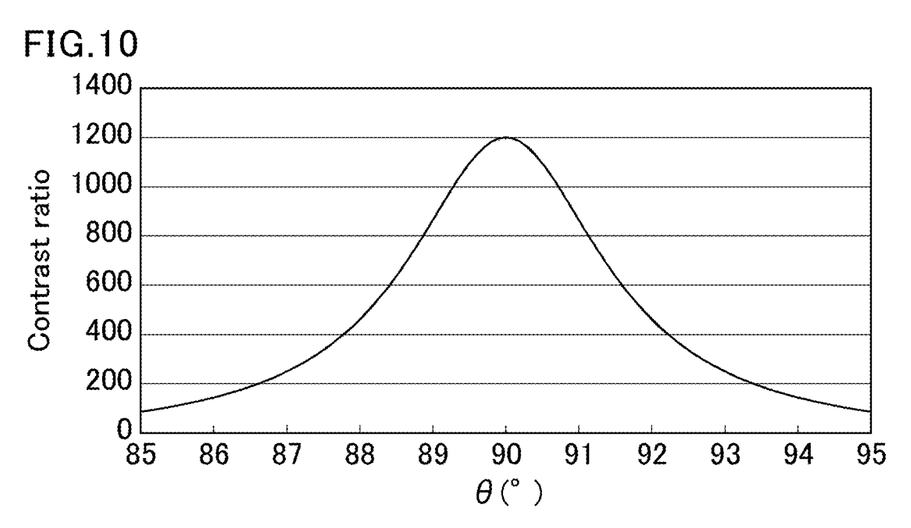
FIG. 10 is a graph showing an exemplary relationship between the angle formed by the transmission axis of the first polarizing plate and the transmission axis of the second polarizing plate and the contrast ratio.

As described above, when the angle θ formed by the transmission axis of the first polarizing plate 10 and the transmission axis of the second polarizing plate 30 is shifted to an angle different from 90°, the luminance uniformity ratio of the black display screen increases as compared with the conventional setting, so that the influence of the light leakage Z is reduced or eliminated. However, in such a state, the increase in luminance of the black display screen causes a decrease in contrast ratio, so that the display quality is lowered even though the influence of the light leakage Z is reduced or eliminated. FIG. 10 is a graph showing an exemplary relationship between the angle formed by the transmission axis of the first polarizing plate and the transmission axis of the second polarizing plate and the contrast ratio. As shown in FIG. 10, for example, in a conventional display state as shown in FIG. 4 (when θ=90), the contrast ratio is about 1200 (luminance uniformity ratio of black display screen: 35%). In contrast, in a display state as shown in FIG. 9 (θ=88.6 or 91.4), the contrast ratio is about 600 (luminance uniformity ratio of black display screen: 50%).

Figure 11:
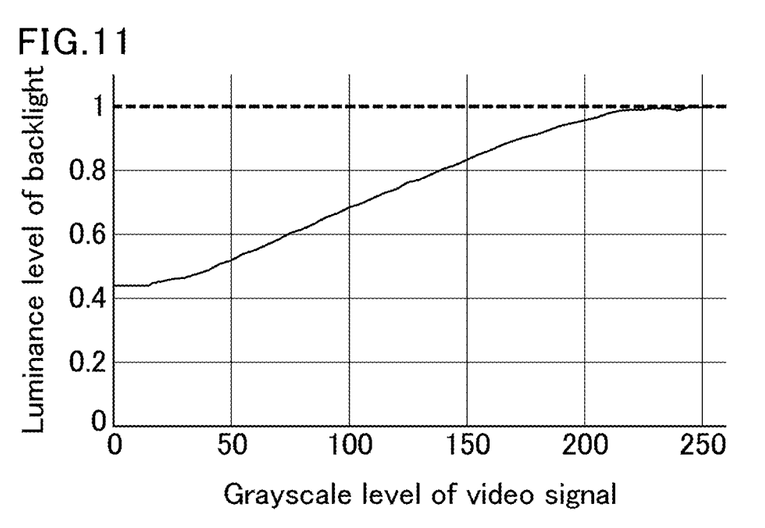
FIG. 11 is a graph showing an exemplary relationship between the grayscale level of a video signal and the luminance level of the backlight, as a characteristic of a control signal generated by a signal corrector.

Thus, in the present embodiment, in order to reduce the luminance of the black display screen and increase the contrast ratio, the signal corrector 4 generates a control signal 50 that sets the luminance of the backlight 3 to a lower level at a lower grayscale level of the video signal 40 input to the signal corrector 4, as in the setting (B). Specifically, the signal corrector 4 detects and analyzes the grayscale level of the input video signal 40 using a tool such as a histogram and generates a control signal 50 (e.g., pulse wide modulation (PWM) mode control signal) that sets the luminance of the backlight 3 to a lower level at a lower grayscale level of the input video signal 40 as shown in FIG. 11. FIG. 11 is a graph showing an exemplary relationship between the grayscale level of a video signal and the luminance level of the backlight, as a characteristic of a control signal generated by a signal corrector. In FIG. 11, the vertical axis "luminance level of backlight" shows normalized values with the luminance level of the backlight 3 at a grayscale level of the video signal 40 of 255 being taken as 1. Also, the solid line shows the characteristic of the control signal 50 in the present embodiment and the dotted line shows the characteristic of a conventional control signal.

As shown in FIG. 11, the control signal 50 causes the luminance of the backlight 3 to be about 50% of the conventional level at a grayscale level of the video signal 40 of 0 (black display state) and to be 100% of the conventional level at a grayscale level of the video signal 40 of 255 (white display state), and sets the luminance to a lower level at a lower grayscale level of the video signal 40. In terms of the display quality, the control signal 50 preferably sets the luminance of the backlight 3 such that the gamma value included in the gamma characteristics (gamma characteristics of the input-output devices including the liquid crystal panel 2 and the backlight 3) is 2.2. In contrast, the conventional control signal sets the luminance of the backlight to a constant level (luminance level: 1) at any grayscale level of the video signal.

The control signal 50 is output from the signal corrector 4 to the backlight driver 6 and the backlight driver 6 actively changes the luminance of the backlight 3 based on the control signal 50. The luminance of the backlight 3 may be changed by, for example, using the content adaptive brightness control (CABC) function of a component such as a system driver of a smartphone.

Figure 12:
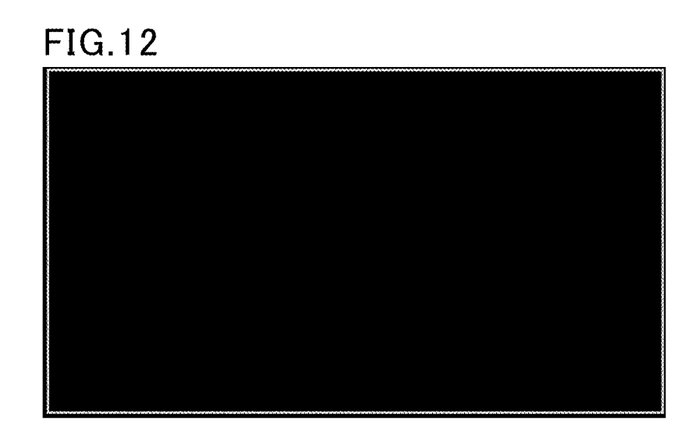
FIG. 12 is a photograph showing the black display screen in the liquid crystal display device of the embodiment.

In a display state as shown in FIG. 9, a black display is provided even though the overall luminance is high (about double the conventional level), and the grayscale level of the video signal 40 input to the signal corrector 4 is 0. Thus, the backlight driver 6 changes the luminance of the backlight 3 to about 50% of the conventional level based on the control signal 50 as shown in FIG. 11. As a result, the display state as shown in FIG. 12 is achieved, so that the luminance of the black display screen is reduced and the contrast ratio is increased as compared with the display state as shown in FIG. 9. FIG. 12 is a photograph showing the black display screen in the liquid crystal display device of the embodiment. For example, in the display state as shown in FIG. 9, the contrast ratio is about 600 (luminance uniformity ratio of black display screen: 50%). In contrast, in the display state as shown in FIG. 12, the contrast ratio is about 1200 (luminance uniformity ratio of black display screen: 50%).

As described above, the contrast ratio decreases when the angle θ formed by the transmission axis of the first polarizing plate 10 and the transmission axis of the second polarizing plate 30 is shifted to an angle different from 90°, but the contrast ratio can be increased when the backlight driver 6 changes the luminance of the backlight 3 based on the control signal 50. Meanwhile, when the angle θ formed by the transmission axis of the first polarizing plate 10 and the transmission axis of the second polarizing plate 30 is shifted to an angle very different from 90°, an increase in luminance of the black display screen causes an excessive decrease in contrast ratio. Specifically, as shown in FIG. 10, when the relationship θ≤85 or θ≥95 holds, the contrast ratio decreases to a value lower than 100. In this state, a high contrast ratio is less likely to be achieved even when the backlight driver 6 sets the luminance of the backlight 3 to a low level based on the control signal 50. For this reason, in the present embodiment, the angle is set to 85<θ<90 or 90<θ<95, preferably 85<θ≤88.6 or 91.4≤θ<95, as in the setting (A).

In summary, the present embodiment achieves a liquid crystal display device in which light leakage in a curved state is reduced or eliminated (luminance uniformity ratio is increased) and which has a high contrast ratio.

The properties mentioned above including the luminance (uniformity ratio) and the contrast ratio were determined using a liquid crystal display device that included a 10.1-inch full high definition (FHD) IPS mode liquid crystal panel and was in a curved state with a curvature radius of 800 mm.

In the present embodiment, the case is described where the liquid crystal display device 1 is convexly curved toward the viewing surface. Yet, the liquid crystal display device 1 may be concavely curved toward the viewing surface. Also, in the present embodiment, the case is described where the liquid crystal display device 1 is curved such that the ends in the short direction of the liquid crystal display device 1 come close to each other. Yet, the liquid crystal display device 1 may be curved such that the ends in the long direction come close to each other.

What is claimed is:

1. A liquid crystal display device comprising:
   a liquid crystal panel including a curved screen;
   a backlight;
   a signal corrector configured to generate a control signal that sets a luminance of the backlight to a lower level at a lower grayscale level of a video signal input thereto, and output the video signal and the control signal;
   a liquid crystal panel driver configured to drive the liquid crystal panel based on the video signal output from the signal corrector; and
   a backlight driver configured to drive the backlight based on the control signal output from the signal corrector, wherein
   the liquid crystal panel includes, in order, a first polarizing plate having a first transmission axis, a liquid crystal cell, and a second polarizing plate having a second transmission axis,
   the first transmission axis and the second transmission axis intersect at an angle θ in a plan view of the liquid crystal panel, and
   the angle θ satisfies a relationship of 85°<θ<90° or 90°<θ<95°.

2. The liquid crystal display device according to claim 1, wherein the control signal sets the luminance of the backlight such that a gamma value included in gamma characteristics is 2.2.

3. The liquid crystal display device according to claim 1, wherein the angle θ satisfies a relationship 85°<θ≤88.6° or 91.4°≤θ<95°.

4. The liquid crystal display device according to claim 1, wherein the liquid crystal panel is a normally black liquid crystal panel.

5. The liquid crystal display device according to claim 1, wherein the signal corrector detects a grayscale level of the video signal and generates the control signal that sets the luminance of the backlight to a lower level in accordance with the detected grayscale level of the video signal.

6. The liquid crystal display device according to claim 1, wherein the signal corrector generates the control signal that sets the luminance of the backlight to be 50% at a grayscale level of the video signal of 0, when the luminance of the backlight is 100% at a grayscale level of the video signal of 255.

* * * * *